Inventor:
HEINZ FLEISSNER
BY Dicke & Craig
ATTORNEYS

Oct. 21, 1969     H. FLEISSNER     3,473,236
APPARATUS FOR THE TREATMENT OF MATERIALS WITH
A GASEOUS OR VAPOROUS MEDIUM
Filed April 7, 1967     3 Sheets-Sheet 3

United States Patent Office 3,473,236
Patented Oct. 21, 1969

3,473,236
APPARATUS FOR THE TREATMENT OF MATERIALS WITH A GASEOUS OR VAPOROUS MEDIUM
Heinz Fleissner, Egelsbach, near Frankfurt am Main, Germany, assignor to Vepa AG, Basel, Switzerland
Filed Apr. 7, 1967, Ser. No. 629,304
Claims priority, application Germany, Apr. 7, 1966, A 52,105
Int. Cl. F26b *13/04, 13/18*
U.S. Cl. 34—115                                32 Claims

ABSTRACT OF THE DISCLOSURE

The present disclosure relates to an apparatus for the treatment of materials, for example, drying materials such as tow, slivers, top fabrics, tricot, fleece, paper, cardboard, and the like, which advantageously can be stressed in the longitudinal direction. According to the present disclosure the material being treated is conveyed in a substantially closed housing on conveying means, for example, cylinders or sieve drums, and rinsed with a gaseous or vaporous treatment medium, said housing containing at least one fan means for circulating the treatment medium and at least one cross current fan means for distributing the treatment medium in said housing.

Background of the invention

The present invention relates to an apparatus for treating materials, for example, drying materials such as running lengths of tow, slivers, top, fabrics, tricot, fleeces, paper, cardboard, and the like, which advantageously can be stressed in the longitudinal direction. More particularly, the present invention concerns an apparatus for the treatment of materials which comprises a substantially closed housing, at least one conveying means rotatably disposed within said housing, fan means providing circulation for the treatment medium, and cross-current fan means for distributing the treatment medium in the treatment housing.

Apparatus for drying, steaming, cooling, conditioning, heat setting, and other treatment processes are generally known. In these devices the treatment medium is generally circulated by means of radial or axial fans. Using these fans the apparatus is subdivided into a suction zone and a pressure zone. It is also known to arrange the heating means in the suction zone as well as in the pressure zone, that is, in front of and behind the fan means. For an apparatus comprising sieve drum means subjected to a suction draft, it is known to correlate to the surface of said sieve drum means, fan means, preferably radial fan means disposed in a fan chamber and separated from the treatment chamber by a partition means. In such an apparatus the radial fans are arranged in extension of the sieve drum axis. Apparatus are also known comprising sieve drum means subjected to a suction draft wherein axial fans are arranged in the sieve drum means or above and/or beneath the sieve drum means. In apparatus wherein the fan means are arranged in the sieve drum means, the fan motor is also disposed within the sieve drum means. This arrangement creates the disadvantage that in the case of operating problems, accessibility to the fan means can only be obtained with difficulty. All of the known apparatus posses the disadvantage that they provide only limited accessibility, such as for example, when the sieve drum drive is mounted at one longitudinal wall of the housing and the fan drive is mounted at the other longitudinal wall of the housing. Apparatus of this type may contain 30 or more drums and generally are only accessible through a few doors in the longitudinal walls of the housing.

Another disadvantage of presently used apparatus is that it is difficult to uniformly distribute the treatment medium, for example, air, which is circulated in the housing and thus it is difficult to obtain a uniform treatment over the entire working width. In heat-setting processes wherein an extremely high temperature consistency is required, it is especially necessary to provide a substantially stable and uniform air flow.

Accordingly, it is an object of the present invention to avoid these prior art disadvantages in an apparatus for the treatment of materials with a gaseous or vaporous medium.

Another object of the present invention is to provide an improved apparatus for the treatment of materials, for example, textile materials, wherein uniform flow conditions can be insured throughout the treatment process.

A further object of the present invention is to provide an improved apparatus for the treatment of materials, such as for example, the drying of textile materials, wherein ready accessibility to the apparatus, especially to the treatment chamber is provided.

Other objects and further scope of the applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Summary of the invention

Pursuant to the present invention, it has been found that the above-mentioned disadvantages may be eliminated and a much improved apparatus for treating materials, for example, drying textile materials, may be obtained by using, among other embodiments, at least one cross-current fan means (transverse-flow fan means) in the treatment apparatus. The apparatus of the present invention comprises a closed, preferably heat-insulated housing, which is subdivided by a partition means into a treatment chamber containing conveying and guiding elements for the material being treated and a fan chamber. The treatment chamber and the fan chamber communicate with each other by means of suction openings disposed in the partition means and by return flow openings. According to the present invention at least one cross-current fan wheel means may be provided in the fan chamber near the return flow openings. It has also been found to be advantageous to provide the suction openings in the partition means in the middle of the treatment chamber and the return flow openings near the housing, preferably at the top and the bottom thereof and to arrange sieve sheets above and below the conveying and guiding elements for equalizing the treatment medium flow. This arrangement particularly applies to conveying and guiding elements which are arranged in one or two horizontal rows. In apparatus wherein the conveying and guiding elements are arranged in one or two vertical rows, the return flow openings as well as the sieve sheets for equalizing the treatment medium flow are accordingly provided at the two sides of these rows.

In order to insure proper operation of the two cross-current fans arranged in one fan chamber it is desirable to sub-divide the treatment medium exhausted from the treatment chamber into two partial flows, by providing a partition means in the suction range of the fan chamber. Furthermore it is often advantageous to arrange heating elements for heating up the treatment medium in the suction range of the fan chamber. If the apparatus is used for cooling instead of heating purposes, cooling elements can be provided in place of heating elements.

In a particularly advantageous embodiment of the present invention, sieve drum means subjected to a suction draft are used as conveying and guiding elements in the treatment apparatus of the present invention. With this apparatus, it is possible to treat loose fibrous materials and other loose stock. According to the present invention, at least two cross-current fan means are correlated to each sieve drum and/or to each group of sieve drums, said cross-current fan means exhausting the treatment medium at one face of the sieve drum. The partition means between the treatment chamber and the fan chamber is also provided with suction openings corresponding to the suction openings in the sieve drum bottom in both size and position.

In addition to providing extremely uniform flow conditions, the apparatus of the present invention offers the additional advantages that the drive means for the conveying and guiding elements can be provided at the fan side of the housing and that the fan drive means can be provided at one or both faces of the apparatus. Thus, one longitudinal wall of the housing can be completely free from driving elements and thus the entire width of the apparatus can be provided with doors permitting ready accessibility to the apparatus.

In an apparatus wherein sieve drum means subjected to a suction draft are used as the conveying and guiding elements for the material being treated, it is possible, according to another embodiment of the present invention, to obtain a substantially uniform suction draft over even large working widths by providing in each sieve drum one cross-current fan wheel means and advantageously, the appertaining guiding elements. The guiding elements may subdivide the sieve drum into a low-pressure zone subjected to a suction draft and preferably covered with the material being treated and into a high-pressure zone which preferably is not covered with the material being treated.

In a further embodiment of the present invention, the heating means can be provided in the sieve drum between the cross-current fan wheel means and the drum jacket and/or around the sieve drum. By utilizing this arrangement, not only is the heat transfer by convection to the material being treated and to the sieve drum utilized, but also the radiation heat which acts directly upon the material as well as indirectly, by heating up the sieve drum. The sieve drum radiates the stored heat to the material being treated by contact heat transfer.

In an advantageous embodiment of the present invention, the driving shaft of the radial fan wheel means is supported in a heater bracket. The sieve drum means may also be supported at one side on the stationary heater bracket and at the other side by means of a hollow driving shaft in the housing. The drive shaft for the radial fan wheel means is, in this embodiment, passed through the hollow driving shaft of the drum. The guiding elements for the fan means may also be mounted to the heater support.

The arrangement of the cross-current fan wheel means in the sieve drum offers the further advantage of an extremely space-saving construction. However, the accessibility of the fan wheel means is somewhat limited. In order to obtain a better accessibility to the cross-current fan means, it is suggested, according to another embodiment of the present invention, to correlate a cross-current fan means to each sieve drum, parallel to its axis and preferably positioned at that portion of the sieve drum which is not covered with the material being treated. However, it is also advantageous to provide a cross-current fan means above and/or below the passageway between two sieve drums. This latter arrangement is particularly desirable since it offers the advantages of good accessibility to the cross-current fan means as well as a space-saving type of construction.

Brief description of the drawings

The present invention will become fully understood from the detailed description hereinbelow and the accompanying drawings which are given by way of illustration only and thus are not limitative of the present invention and wherein.

Description of the preferred embodiments

Figure 1:
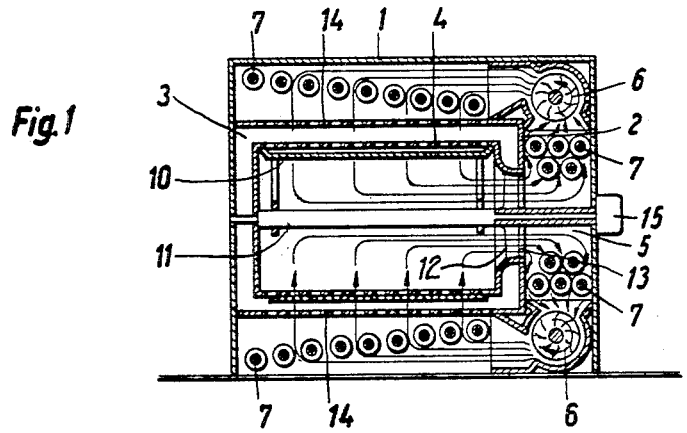
FIGURE 1 is a cross-sectional view of an apparatus of the present invention with sieve drum subjected to a suction draft.
Figure 2:
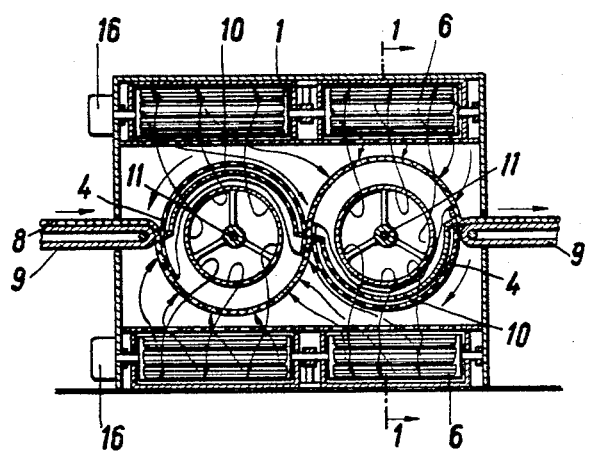
FIGURE 2 is a longitudinal section of the apparatus of the present invention according to FIGURE 1.

Referring now to the drawings wherein like reference numerals are used throughout the various views to designate like parts, the apparatus of the present invention according to FIGURES 1 and 2 comprises a substantially closed, heat-insulated housing 1 which is subdivided by a partition means 2 into a treatment chamber 3 with sieve drum 4 subjected to a suction draft and into a fan chamber 5 containing two cross-current fan wheel means (transverse flow fan means) 6 and heating means 7. For feeding and discharging material 8 in this apparatus, conveyer belts 9 are provided at the inlet and the outlet of the apparatus. Baffle means 10 are arranged in adjacent sieve drums, alternately in the upper and lower portions thereof, and function to interrupt the suction draft at that portion of the sieve drum which is not covered with the material being treated so that the material 8 is passed automatically from one sieve drum to the next sieve drum.

The sieve drum 4 is supported on a stationary drum axis 11 which also supports the stationary baffle means 10. The sieve drum bottom adjacent to the fan chamber 5 is provided with a suction socket 12 to which a corresponding opening 13 in partition means 2 is correlated. For equalizing the treatment medium flow sieve sheets 14 are arranged above and below the sieve drums. However, such sieve sheets are generally only required when treating loose material and also in apparatus in which emphasis is placed on extremely uniform temperature conditions and extremely uniform temperature medium flow over the entire working width. An equalization of the treatment medium flow can also be obtained by obliquely arranged heating means provided in the treatment chamber above and beneath the sieve sheets. However, these additional heating means are only required for very high temperatures. In general, heating means in the fan chamber or in the treatment chamber will be sufficient.

The drum drive 15 in the apparatus of the present invention can be mounted to the longitudinal wall of the housing of the fan chamber so that the longitudinal wall of the housing of the treatment chamber is completely free from driving elements. Accordingly, ready accessibility can be provided by designing this longitudinal wall of the housing with doors which are detachable and/or liftable. According to this embodiment of the present invention, drive means 16 for the cross-current fans is mounted to the longitudinal wall at the inlet.

Figure 3:
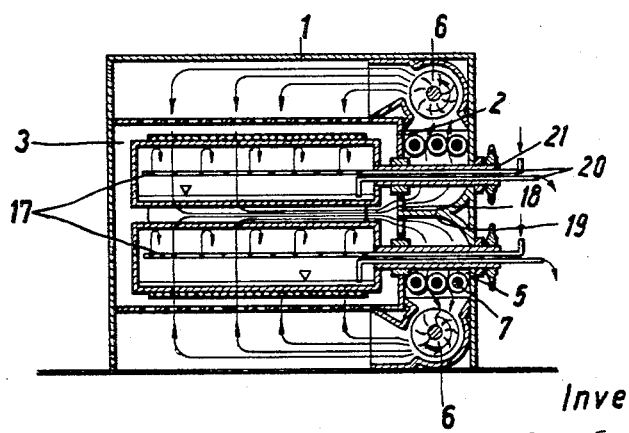
FIGURE 3 is a cross-sectional view of the apparatus of the present invention using heated cylinders.
Figure 4:
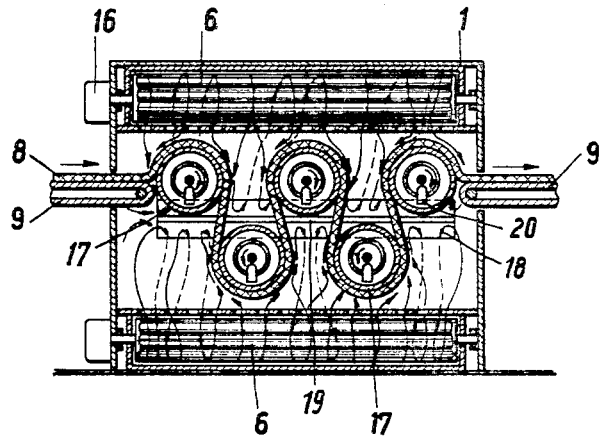
FIGURE 4 is a longitudinal section of the apparatus according to FIGURE 3.

The apparatus according to FIGURES 3 and 4 is very similar to the apparatus according to FIGURES 1 and 2. However, in the apparatus of FIGURES 3 and 4, cylinders 17 which can be heated with steam, diphyl or other gaseous or liquid heat carriers are used as conveying and guiding elements. The cylinders 17 can be arranged in two rows staggered to each other. Also, the gaseous or vaporous treatment medium is circulated in this apparatus by means of cross-current fans 6. For this purpose, a slit-shaped opening 18 is provided in partition means 2, said opening being subdivided by a partition means 19 in fan chamber 5. This partition means 19 subdivides the fan chamber 5 into two zones and produces two partial treatment medium flows which are separated from each other. Also, one longitudinal wall of the housing of this apparatus is completely free from any driving and bearing elements and thus can be designed as detachable walls or as doors. The heated cylinders are, for this purpose, supported unilaterally in partition means 2 and housing 1. For supplying and discharging the heating medium, tubes 20 are used which extend through a hollow drive shaft 21 into the cylinders 17.

Figure 5:
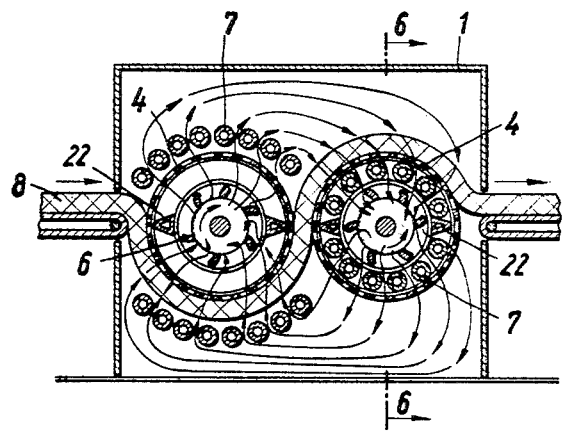
FIGURE 5 is a longitudinal section of another embodiment of the apparatus of the present invention using sieve drums.
Figure 6:
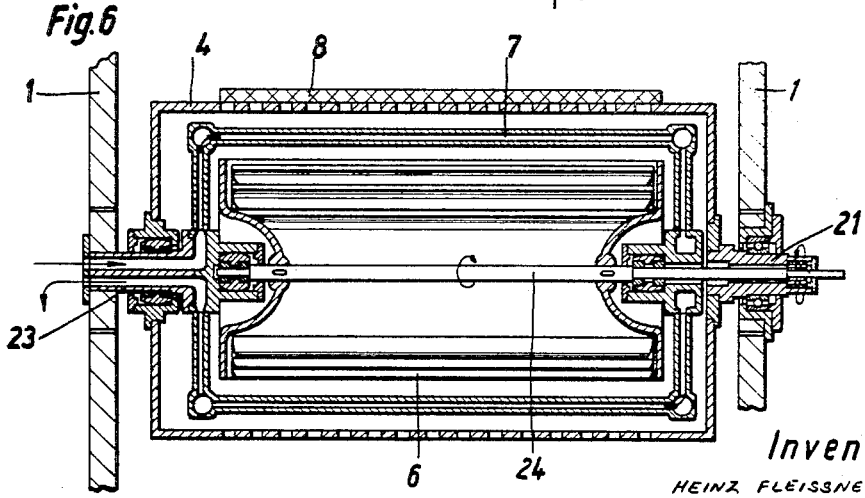
FIGURE 6 is a cross-sectional view of a sieve drum of the present invention according to FIGURE 5.

In the apparatus according to FIGURES 5 and 6, cross-current fan means 6 are arranged in the sieve drums 4. Furthermore, guiding elements 22 which subdivide the interior of each sieve drum into a suction zone and a high-pressure zone are also provided in the sieve drums. FIGURE 5 shows two possible arrangements for heating means 7. For example, the sieve drum at the inlet can have heating tubes 7 disposed around the sieve drum and/or the material being treated on the sieve drum, and the sieve drum at the outlet can use heaters arranged between the cross-current fan means and the sieve drum jacket.

The number of sieve drums and/or heated cylinders shown in the figures are given by way of example only, and any desired number of sieve drums or cylinders or combinations thereof can be used. In practice, sieve drum drying apparatus containing 30 or more sieve drums are frequently used. Thus, in such sieve drum drying apparatus, it is possible and frequently desirable to provide for example, heating means either around those portions of the sieve drums covered with the material being treated, around those portions of the sieve drums which are not covered with the material being treated, and also inside of the sieve drums, and any combination of these arrangements, the only criteria being that the apparatus is provided with the desired heating capacity.

In the embodiment of the present invention according to FIGURE 6, sieve drum 4 is provided with a heating means 7 disposed within the sieve drum. At one side of the sieve drum a heater bracket 23 is rigidly mounted to housing 1. At this side, the sieve drum is supported on this heater bracket. A drive shaft 24 for cross-current fan wheel means 6 is also supported in this heater bracket at this side of the apparatus. At the other side of the housing 1, the drives (not shown) for the drums and the cross-current fan means are situated. A hollow drive shaft 21 for drum 4 is supported in housing 1 and the drive shaft 24 for the cross-current fan wheel means is supported in this hollow drive shaft 21. Heating means 7 is supported at this side of the apparatus by the drive shaft 24 for the cross-current fan means, via a bearing.

Figure 7:
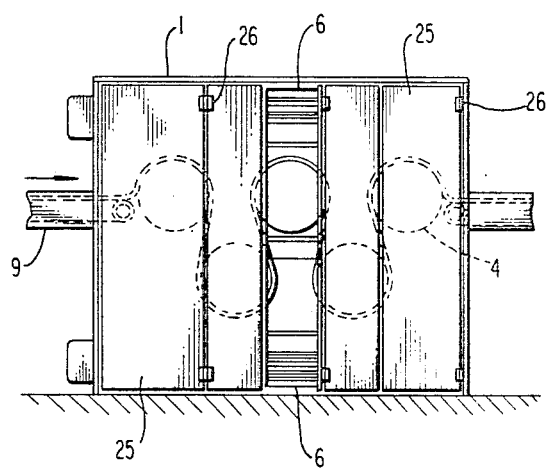
FIGURE 7 shows doors provided in the front longitudinal wall of the housing.

FIGURE 7 shows the front longitudinal wall of the housing designed as doors 25 provided with hinges 26. As can be readily seen, said doors are free from bearing and driving means.

A further embodiment of the present invention can be achieved if the cross-current fan means is provided outside of the sieve drum, for example, above and/or below the path of material passage from one sieve drum to the next sieve drum. Since such an embodiment does not present any difficulties with respect to design, it has not been shown in the drawings.

Since modifications of this invention will be apparent to those skilled in the art, it is not desired to limit the invention to the exact constitution shown and described. Accordingly, all suitable modifications and equivalents may be resorted to which fall within the scope of the appended claims.

I claim:
1. An apparatus for the treatment of materials which comprises a substantially closed housing, at least one conveying means rotatably disposed within said housing, inlet means for introducing the material to be treated to said housing, transverse-flow fan means substantially as wide as at least one of said conveying means for circulating and distributing the treatment medium in the housing, and outlet means for removing the treated material from the housing.

2. The apparatus of claim 1, wherein the housing is divided by a partition means into a treatment chamber which accommodates the conveying means, and a fan chamber, said treatment chamber communicating with said fan chamber through suction openings in said partition means and by return flow openings near said housing, the transverse-flow fan means being disposed in the fan chamber near said return flow openings.

3. The apparatus of claim 2, wherein the suction openings in the partition means are provided in the middle of the treatment chamber and the return flow openings are provided near the housing at its upper and lower portion thereof.

4. The apparatus of claim 3, wherein sieve sheet means are disposed above and below the conveying means for equalizing the treatment medium flow.

5. The apparatus of claim 2, wherein additional partition means are provided in the fan chamber for dividing the treatment medium exhausted from the treatment chamber into two partial flows.

6. The apparatus of claim 5, wherein heating means are provided within the circulation of the treatment medium.

7. The apparatus of claim 6, wherein heating means are disposed in the fan chamber.

8. The apparatus of claim 6, wherein heating means are disposed in the treatment chamber.

9. The apparatus of claim 8, wherein the heating means are obliquely arranged above and beneath the sieve sheet means to provide equalization of the treatment medium.

10. The apparatus of claim 1, wherein the conveying means is at least one cylindrical sieve drum subjected to a suction draft and wherein at least two transverse-flow fan means exhaust the treatment medium at one sieve drum face and are correlated to the sieve drum.

11. The apparatus of claim 1, wherein the drive for the conveying means is disposed at the longitudinal wall on the fan side of the sieve drum.

12. The apparatus of claim 1, wherein the fan drive is provided at one or both faces of the apparatus.

13. The apparatus of claim 1, wherein the front longitudinal wall of the housing is free from bearing and driving means and provided with doors permitting access to the treatment apparatus.

14. The apparatus of claim 1, wherein the conveying means is at least one cylinder.

15. The apparatus of claim 14, wherein said cylinder is provided with inlet and outlet tubing means for heating or cooling said cylinder.

16. The apparatus of claim 15, wherein the inlet and outlet tubing communicates with the inside of the cylinder through hollow drive shaft means disposed in the partition means and the longitudinal wall of the housing.

17. The apparatus of claim 16, wherein the partition means are provided with slit-shaped openings and additional partition means are provided in the fan chamber to divide the treatment medium exhausted from the treatment chamber into two partial flows.

18. The apparatus of claim 14, wherein more than one cylinder is disposed in said housing in a staggered relationship to each other.

19. The apparatus of claim 1, wherein the conveying means is a cylindrical sieve drum subjected to a suction draft and wherein the cross current fan means and appertaining guiding elements are disposed in each sieve drum.

20. The apparatus of claim 19, wherein the guiding elements subdivide the sieve drum into a low pressure zone subjected to a suction draft and covered with the material being treated and a high pressure zone which is not covered with the material being treated.

21. The apparatus of claim 20, wherein heating means are provided in the sieve drum between the cross current fan means and the sieve drum jacket.

22. The apparatus of claim 20, wherein the heating means are provided around the cylindrical surface of the sieve drum.

23. The apparatus of claim 21, wherein the heating means communicates with a channel disposed in a heater bracket means mounted to a longitudinal wall of the housing.

24. The apparatus of claim 23, wherein the drive shaft of the radial fan means is supported in the heater bracket means.

25. The apparatus of claim 23, wherein the drive shaft of the cross current fan means is supported in the heater bracket means.

26. The apparatus of claim 23, wherein the sieve drum is supported on the heater bracket means at one side of the housing and by means of a hollow drive shaft at the other side of the housing.

27. The apparatus of claim 19, wherein the guiding elements for the cross current fan means are mounted to the heater bracket means.

28. The apparatus of claim 25, wherein the drive shaft is supported at one longitudinal wall of the housing in the heater bracket means and at the other longitudinal wall of the housing in a hollow drive shaft.

29. The apparatus of claim 23, wherein the heating means is supported at one longitudinal wall of the housing by a bearing means which supports the drive shaft for the fan means.

30. The apparatus of claim 1, wherein the cross current fan means is correlated to each conveying means par-axially at that portion of the conveying means which is not covered by the material being treated.

31. The apparatus of claim 1, wherein the cross current fan means are disposed above and below the passageway between two sieve drum.

32. The apparatus of claim 10, wherein baffle plate means are provided on the inside of said sieve drums to interrupt the flow at that portion of said sieve drums which are not covered with the material being treated.

References Cited

UNITED STATES PATENTS

| | | | |
|---|---|---|---|
| 3,011,266 | 12/1961 | Fleissner | 34—115 XR |
| 920,351 | 5/1909 | Layland et al. | 34—115 |
| 3,065,551 | 11/1962 | Cohn et al. | 34—115 XR |
| 3,345,756 | 10/1967 | Bryand et al. | 34—115 |

FOREIGN PATENTS 1,331,702  5/1963  France.

KENNETH W. SPRAGUE, Primary Examiner

U.S. Cl. X.R.

34—122